June 16, 1925.
O. BEZANSON
1,542,488
PROCESS FOR THE MANUFACTURE OF SULPHURIC ACID BY THE CONTACT PROCESS
Filed Sept. 24, 1923
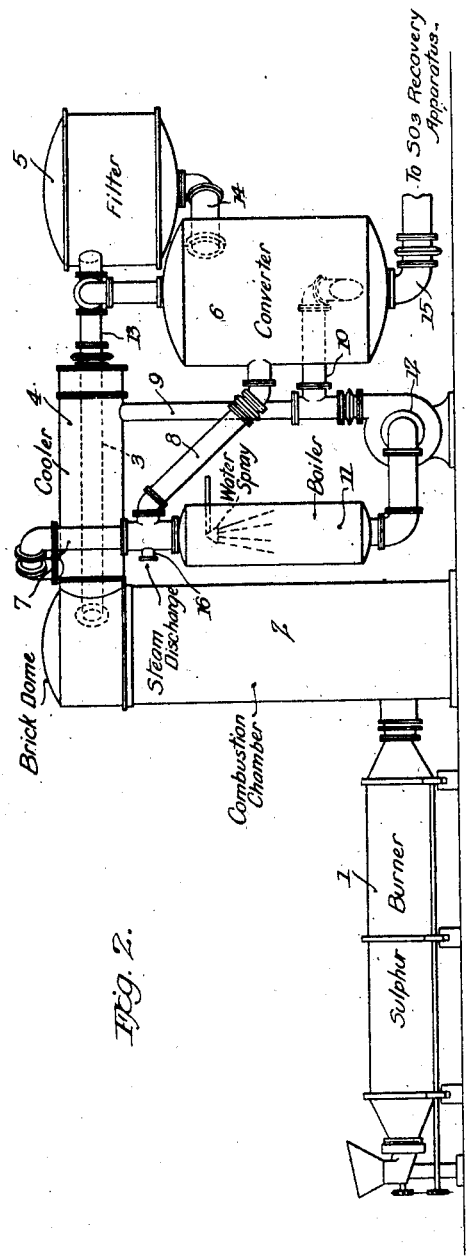
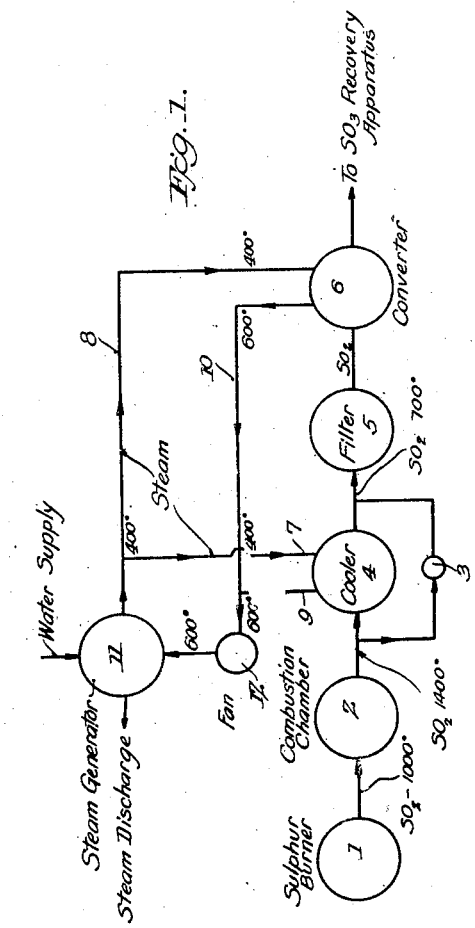
Inventor
Osborne Bezanson
By Byrnes Townsend & Brickenstein
his Attorneys Patented June 16, 1925.

1,542,488

UNITED STATES PATENT OFFICE.

OSBORNE BEZANSON, OF WOBURN, MASSACHUSETTS, ASSIGNOR TO MERRIMAC CHEMICAL COMPANY, OF WOBURN, MASSACHUSETTS, A CORPORATION OF MASSACHUSETTS.

PROCESS FOR THE MANUFACTURE OF SULPHURIC ACID BY THE CONTACT PROCESS.

Application filed September 24, 1923. Serial No. 664,557.

*To all whom it may concern:*

Be it known that I, OSBORNE BEZANSON, a citizen of the United States, residing at Woburn, in the county of Middlesex and State of Massachusetts, have invented certain new and useful Improvements in Processes for the Manufacture of Sulphuric Acid by the Contact Process, of which the following is a specification.

This invention relates to improvements in the contact process for the manufacture of sulphuric anhydride and sulphuric acid.

The usual practice in the manufacture of sulphuric acid by the contact process involves in general, burning a sulphur containing material such as pyrite to produce sulphur dioxid, cooling the burner gases to a relatively low temperature and purifying them by a plurality of treatments including ordinary filtration and scrubbing, and then reheating the gases and passing them to the converter or contact mass. In the process as it is usually practiced the heat of the hot burner gases is lost or wasted and the gas-purifying process (filtration, scrubbing, etc.) is not only expensive, involving the use of expensive apparatus and material, the employment of considerable labor, and the expenditure of power for handling the gases and the scrubbing liquid, but is also more or less unsatisfactory. Also in some of the processes now in extensive commercial use it is customary to use fuel for reheating the purified gases, thus adding a further expense to the process, and if cooling of the converters is necessary, as it frequently is, the heat taken therefrom ordinarily is wasted.

It has been proposed to avoid the mentioned purification, and incidentally the extensive cooling and reheating of the gases referred to, by using as the raw material for the production of the sulphur dioxid Louisiana brimstone and by maintaining the gases throughout the process at a high temperature (not below the temperature required for the producton of sulphuric anhydrid in the converter), see for instance Patent No. 1,384,566 to Merriam. It has also been proposed to conserve the heat of the gases by heat interchange from the gases to be cooled at one stage of the process to the gases to be heated at another stage of the process, see for instance Patent No. 1,405,669 to Chase and Pierce.

My invention relates to a process of this general type in which in addition to the elimination of extensive purifying procedure and the conservation of the heat of process, the excess of heat produced by the reactions involved is saved and incident thereto the preferred temperature conditions are easily and accurately maintained.

My invention involves broadly the use of steam as the cooling medium and more specifically it involves a novel and highly advantageous method of handling the steam, whereby not only is the temperature of the gases in the various stages of the process maintained at the point most suitable but the excess of heat is used for the generation of steam which may be withdrawn and used for any desired purpose.

In the preferred embodiment of my invention which will be described in detail hereinafter by way of illustration, steam which preferably is dry is supplied from a boiler to the cooler for the burner gases and to the converter and the resulting superheated steam is returned to the boiler where its superheat is used for the generation of more cooling steam, the excess of steam so produced being withdrawn from the system for use as desired, for instance, for the generation of power.

On the drawings,

Fig. 1 is a diagrammatic illustration of the several parts of the apparatus on which the movement of the gases is indicated by suitable legends; and Fig. 2 illustrates one form of apparatus suitable for carrying out the process.

Referring to Fig. 1, 1 represents the sulphur burner; 2 a combustion chamber for the gases leaving the burner 1 in which the oxidation of any volatilized elemental sulphur takes place; 3 a by-pass for the burner gases from the combustion chamber 2 around the cooler 4 to the filter 5; 6 a converter, and 11 a steam generator provided with a water supply, a steam discharge, and parallel connections 7 and 8 for the delivery of cooling steam to the cooler 4 and the converter 6 and parallel connections 9 and 10 for the delivery of the resulting superheated steam back to the fan 12.

The apparatus as it is illustrated in Fig. 2 comprises a sulphur burner 1 which may be of any suitable type, for instance a so-called "Glen Falls" burner, which discharges into the lower end of the vertical cylindrical combustion chamber 2, the gases leaving the upper end thereof and passing through the by-pass 3 to the filter 5 or through the cooler 4 which may be of any suitable construction, for instance, that of a tubular boiler. Cooling steam is supplied to the cooler 4 from the boiler 11 through the pipe 7 and the superheated steam produced in the cooler is returned to the boiler through the pipe 9 by the fan 12. The burner gases leaving the cooler 4 pass by way of pipe 13 into the filter 5 and therefrom by way of pipe 14 into the top of the converter 6. The converter may be of any suitable construction but so designed that the contact mass is supported in heat transfer relation to the steam supplied thereto from the boiler. For instance, the converter may be in the form of a tubular boiler in which the contact mass is held in the tubes and steam is passed through the surrounding jacket. Steam is supplied to the converter from the boiler through the pipe 8 and returned from the converter to the boiler by the pipe 10 and fan 12. The gases leaving the converter at the bottom pass by way of the pipe 15 to the usual $SO_3$ recovering apparatus (not shown).

An example of the operation of the process is as follows:

Sulphur is burned in the burner 1 and the resulting gases at about 1000° F. pass to the combustion chamber 2 where the oxidation of any unburned sulphur is completed. The gases leave the combustion chamber 2 at about 1400° F. and pass to the cooler 4 where they are cooled to about 700° F. by heat interchange with steam supplied from the boiler 11 at about 400° F. The cooled burner gases are then passed through the dry filter 5 for the removal of dust and then to the converter 6 which is also supplied with steam from the boiler 11 at about 400° F. The gases pass then from the converter 6 to the $SO_3$ recovering apparatus. The steam after passing through the cooler 4 and the converter 6 in parallel and which is at a temperature somewhat above 400° F., say 600° F., is delivered by the fan 12 to the boiler 11 where its superheat or a part of it is used for the generation of more steam. This may be done for instance by using the superheated steam as the heating gas in an ordinary tubular boiler or as is illustrated by delivering the superheated steam and a regulated spray of water into a chamber, whereby the steam is cooled and the injected water vaporized. The required quantity of the resulting steam is returned to the cooler 4 and the converter 6 for cooling or regulating the temperature thereof as described and the excess of steam produced in the boiler is delivered through the pipe 16 for use as desired.

In connection with the foregoing specific disclosure it is of course understood that the invention is not limited to the particular procedure and conditions described. For instance, it is conceivable that the vapor of liquids other than water might be used as the cooling medium but water appears to be the most suitable material for use on account of its low cost. The steam temperatures referred to, that is, 400° F. for the cooling steam and 600° F. for the superheated steam, may be varied. For instance, the cooling steam may have a lower temperature and the superheated steam a higher temperature. The temperatures of the steam of course may vary with the type of apparatus used, etc. It may be that under some circumstances the steam will serve as a heating medium for the converter rather than as a cooling medium or it may serve to cool one zone and heat another zone. The essential feature in this connection is that the temperature of the converter is regulated and maintained at the preferred point by means of steam. The gas temperatures mentioned also are merely illustrative and may vary considerably, depending upon the concentration of the burner gases, construction of flues, nature or activity and arrangement of contact mass, etc., as will be apparent to one skilled in the art. The principal feature to be observed in the control of the process is that the burner gases are cooled down only to a temperature at which they may be advantageously delivered to the converter without however permitting the temperature to go to the point at which the combination of water in the air entering the system with the burner gases will combine with $SO_3$ to form sulphuric acid mists. By operating in this manner the expensive purification of the gases, including filtration and scrubbing to remove sulphuric acid mists and fogs, drying and remoistening, and cooling and reheating are avoided and the economy of the process and apparatus is correspondingly increased.

It is noted that the process and apparatus employed in accordance with my invention are both very simple and inexpensive as compared with the process and apparatus in current use heretofore referred to. It combines the features of maintaining the temperature of the gases and the incident elimination of expensive purifying apparatus and procedure with easy and accurate temperature regulation and heat economy.

A feature of the invention is the very low resistance of the entire system to the passage of gases with the consequent advantages, notably low consumption of power for the mechanical operation of the process.

The automatic regulation of the various operations of the process such as the supply of sulphur and air to the burner, the supply of cooling steam to the cooler and converter, and the supply of water to the boiler by, for instance, thermostatically-operated valves, of course is contemplated and the employment of such regulating means is not to be regarded as a departure from my invention.

I claim:

1. In processes for the manufacture of sulphuric acid by the contact process, the step which consists in passing steam from a source of supply into heat transfer relation to relatively hotter sulphurous gases and returning the resulting superheated steam to said source of supply.

2. In processes for the manufacture of sulphuric acid by the contact process involving the passage of hot gases through a plurality of instrumentalities in succession, the step which consists in passing a plurality of parallel streams of relatively cooler steam from a single source of supply into heat transfer relation to the gases in a plurality of said instrumentalities.

3. In processes for the manufacture of sulphuric acid by the contact process involving the passage of hot sulphur dioxid containing gases successively through a cooler and a converter, the step which consists in passing steam from a source of supply into heat transfer relation to the gases in the cooler and in the converter and returning the same to the source of supply and employing the superheat thereof for the generation of steam.

4. In the process of making sulphuric acid by the contact process by passing hot burner gases containing sulphur dioxid through a cooler and a converter in succession, the steps which consist in generating steam at a temperature of about 400° F., passing the steam in heat transfer relation to the gases passing through the cooler and the converter, contacting the resulting steam with water in quantity sufficient to reduce the temperature thereof to about 400° F. and to convert said water into steam at said temperature, passing a part of the resulting steam through the cooler and the converter in a succeeding cycle of the operation, and withdrawing the remainder of said resulting steam from the process.

5. In the process for the manufacture of sulphuric acid in which hot burner gases are passed through a cooler and then without further substantial temperature change into a converter, the steps comprising circulating parallel streams of steam from a steam generator into heat transfer relation to the gas in the cooler and converter and back to the steam generator.

6. Apparatus for the manufacture of sulphuric acid comprising in combination with a source of hot burner gases containing sulphur dioxid, a cooler and a converter, a steam generator, and means for delivering separate streams of steam from said generator through said cooler and said converter and back to said generator.

In testimony whereof, I affix my signature.

OSBORNE BEZANSON.